US012223076B2

(12) United States Patent
Nookala et al.

(10) Patent No.: US 12,223,076 B2
(45) Date of Patent: Feb. 11, 2025

(54) SERVICE AND SYSTEM INTEGRATION

(71) Applicant: SAP SE, Walldorf (DE)

(72) Inventors: Ranjith Kumar Nookala, Bengaluru (IN); Rajarshi Ghosh, Mannheim (DE); Simone Turrin, Heidelberg (DE); Satyendra Dhar, Bangalore (IN)

(73) Assignee: SAP SE, Walldorf (DE)

( * ) Notice: Subject to any disclaimer, the term of this patent is extended or adjusted under 35 U.S.C. 154(b) by 344 days.

(21) Appl. No.: 17/975,233

(22) Filed: Oct. 27, 2022

(65) Prior Publication Data
US 2024/0143809 A1    May 2, 2024

(51) Int. Cl.
    *G06F 21/62*    (2013.01)
(52) U.S. Cl.
    CPC ................. *G06F 21/6218* (2013.01)
(58) Field of Classification Search
    CPC .................................... G06F 21/6218
    USPC ........................................... 726/26
    See application file for complete search history.

(56) References Cited

U.S. PATENT DOCUMENTS

| 11,210,412 B1* | 12/2021 | Ghetti ................ H04L 9/0861 |
| 2021/0397585 A1* | 12/2021 | Seward ................ G06F 16/176 |
| 2023/0046771 A1* | 2/2023 | Kannan ................ G06Q 10/103 |

* cited by examiner

*Primary Examiner* — Benjamin A Kaplan
(74) *Attorney, Agent, or Firm* — Buckley, Maschoff & Talwalkar LLC

(57) ABSTRACT

A system and method including receiving, from a first user of a first service, an indication of a second service to integrate with the first service; correlating a presence of the first user of the first service with an identifier of the first user in the second service; receiving, from a second user of the first service, an indication of the second service to integrate with the first service; correlating a presence of the second user of the first service with an identifier of the second user in the second service; receiving, from the second service via an application programming interface, a replication of a statement of work generated by the second service and associated with the second user; and persisting the replication of the statement of work in a data store of the first service that is accessible by the first user of the first service.

20 Claims, 11 Drawing Sheets

(A)

| | Application Settings ▽ | | | | External Systems |
|---|---|---|---|---|---|
| External System Details | | | | | Search |
| ☐ 56 Active | | | | | |
| External Systems (56) | | | | | |
| ☐ System Name | System Type | System Status | Destination Name | | |
| ☐ 0dhsiq3a8t | ERP | Active | je8dqaalo3 | | |
| ☐ 0guyrforv1 | ERP | Active | wy8q2iplt8 | | |
| ☐ 0ji1zxitts | ERP | Active | 7h09alvo90 | | |
| ☐ 0y7w4dh80C | ERP | Active | kd890vfpov | | |
| ☐ 16k1lj870s | ERP | Active | 8qy4n9krgk | | |
| ☐ 25inqc95i3 | ERP | Active | jm60igdgcu | | |
| ☐ 2un92npycy | ERP | Active | x97bfxz95C | | |
| ☐ 34nprca3mr | ERP | Active | 0848w1xlj0 | | |
| ☐ 46ffoafcznq | ERP | Active | ss14z2x6u1h | | |
| ☐ 494xhcunio | ERP | Active | n4k9rbq7tq | | |
| ☐ 4fupk58s5r | ERP | Active | z5j14ats6h | | |
| ☐ 4lom74rtxe | ERP | Active | 621mc1gieq | | |

| | Application Settings ▽ | | | | External Systems |
|---|---|---|---|---|---|
| External System Details | | | | | field |
| ☐ 57 Active | | | | | |
| External Systems (1) | 310 | | | | |
| ☐ System Name | System Type | System Status | Destination Name | | |
| ☐ FG_SYS | VMS | Active | | | |

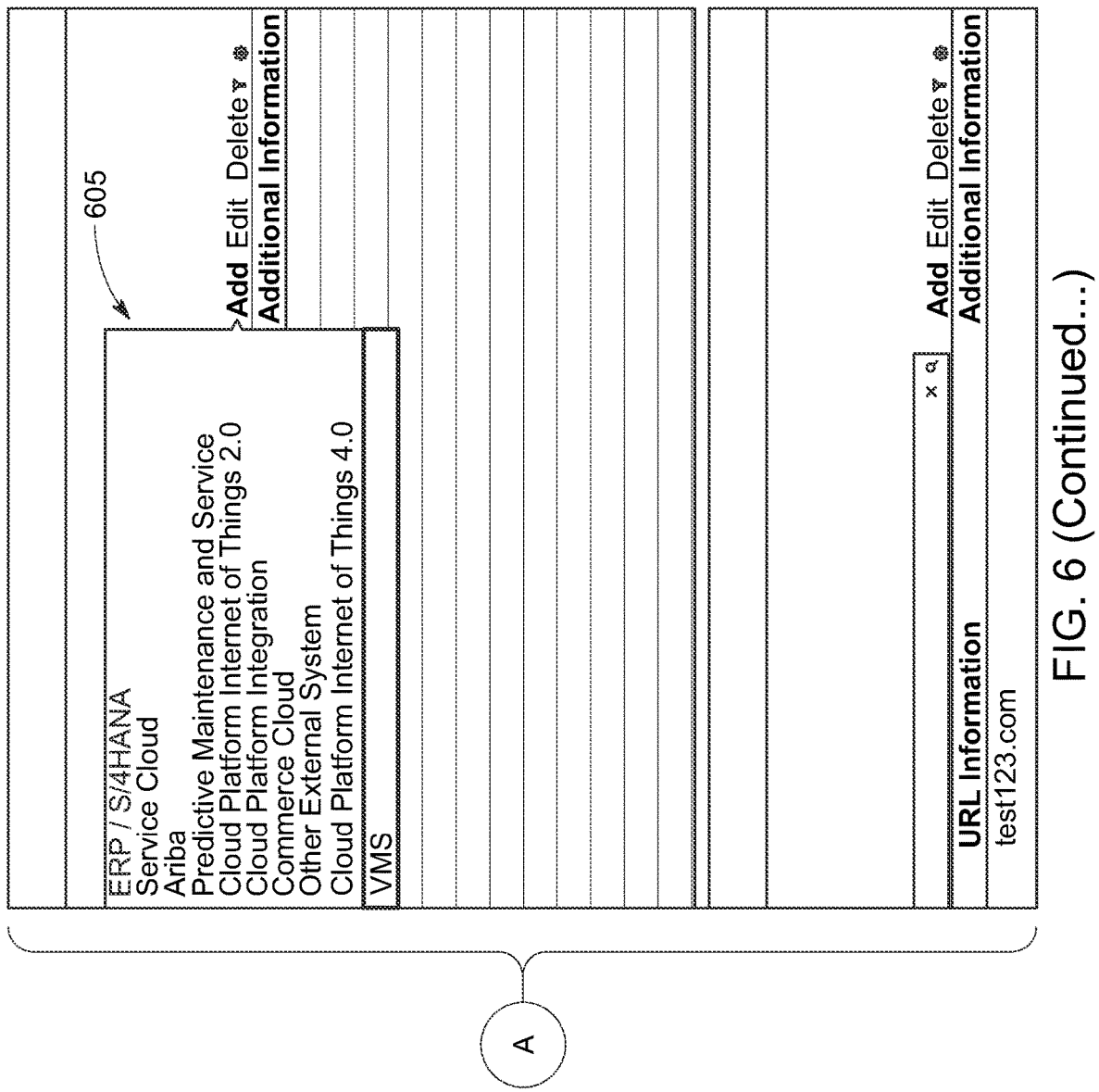
FIG. 6 (Continued...)

| Object Type | Fields |
|---|---|
| SoW (Statement of Work) | SoW ID, Buyer Code, Revision Number, SoW Name, Start Date, End Date, Status, Supplier Code, Supplier Name, Buyer Name, Purchase Order, Purchase Order Item Number, External System ID, SoW ZID |
| Worker | SoW ID, Worker ID, Worker ZID, Worker First Name, Last Name, SoW Worker Role, Outstanding Onboarding Item Count, Work order Start Date, Work order End Date, User Name |

```
┌─────────────────────────────────────────────────┐
│ RECEIVE, FROM A FIRST USER OF A FIRST SERVICE,  │
│ AN INDICATION OF A SECOND SERVICE TO            │
│ INTEGRATE WITH THE FIRST SERVICE                │
│                                          1005   │
└─────────────────────────────────────────────────┘
                        ↓
┌─────────────────────────────────────────────────┐
│ CORRELATE, IN THE FIRST SERVICE, A PRESENCE OF  │
│ THE FIRST USER OF THE FIRST SERVICE WITH AN     │
│ IDENTIFIER OF THE FIRST USER IN THE SECOND SERVICE │
│                                          1010   │
└─────────────────────────────────────────────────┘
                        ↓
┌─────────────────────────────────────────────────┐
│ RECEIVE, FROM A SECOND USER OF THE FIRST SERVICE,│
│ AN INDICATION OF THE SECOND SERVICE TO          │
│ INTEGRATE WITH THE FIRST SERVICE                │
│                                          1015   │
└─────────────────────────────────────────────────┘
                        ↓
┌─────────────────────────────────────────────────┐
│ CORRELATE, IN THE FIRST SERVICE, A PRESENCE OF THE│
│ SECOND USER OF THE FIRST SERVICE WITH AN IDENTIFIER│
│ OF THE SECOND USER IN THE SECOND SERVICE        │
│                                          1020   │
└─────────────────────────────────────────────────┘
                        ↓
┌─────────────────────────────────────────────────┐
│ RECEIVE, FROM THE SECOND SERVICE VIA AN         │
│ APPLICATION PROGRAMMING INTERFACE, A            │
│ REPLICATION OF A WORK SPECIFICATION GENERATED   │
│ BY THE SECOND SERVICE AND ASSOCIATED WITH       │
│ THE SECOND USER                                 │
│                                          1025   │
└─────────────────────────────────────────────────┘
                        ↓
┌─────────────────────────────────────────────────┐
│ STORE THE REPLICATION OF THE WORK SPECIFICATION │
│ RECEIVED FROM THE SECOND SYSTEM IN A DATA       │
│ STORE OF THE FIRST SERVICE THAT IS ACCESSIBLE   │
│ BY THE FIRST USER OF THE FIRST SERVICE          │
│                                          1030   │
└─────────────────────────────────────────────────┘
```

*FIG. 10*

SERVICE AND SYSTEM INTEGRATION

BACKGROUND

An enterprise or other entity may be a party to numerous agreements, contracts, and other working relationships involving a plurality of other entities and relating to one or more projects, work orders, assignments, and the like. For example, a plant operator might need the various equipment in their plant maintained, a service often provided by one or more outside service providers. The enterprise may typically have one or more back-end systems supporting and implementing the processes (e.g., procurement, etc.) related to the maintenance of their plant. Likewise, the plurality of other entities the enterprise may need to work with including, for example, maintenance service providers, plant equipment manufacturers, etc. may each also have back-end system(s) that support the implementation of their work processes. The data generated and used by the enterprise and other entities is often only semi-digitized and must be entered into the back-end systems. Moreover, the process operations or steps of the various parties, including their respective systems, are not typically integrated with each other.

Accordingly, it would therefore be desirable to provide a framework for integrated services and systems to, for example, support and facilitate an efficient collaboration and sharing of data.

BRIEF DESCRIPTION OF THE DRAWINGS

FIG. 7 is an illustrative outward facing user interface for defining an object type for an integrated service, according to an example embodiment; and FIG. 8 is an illustrative outward facing user interface for mapping a user identity for an integrated service, according to an example embodiment;

FIG. 9 is an illustrative depiction of a representation of example data related to an integrated system and service, according to an example embodiment;

FIG. 10 is an illustrative flow diagram for a process related to an integrated system and service, according to an example embodiment.

DETAILED DESCRIPTION

Figure 1:
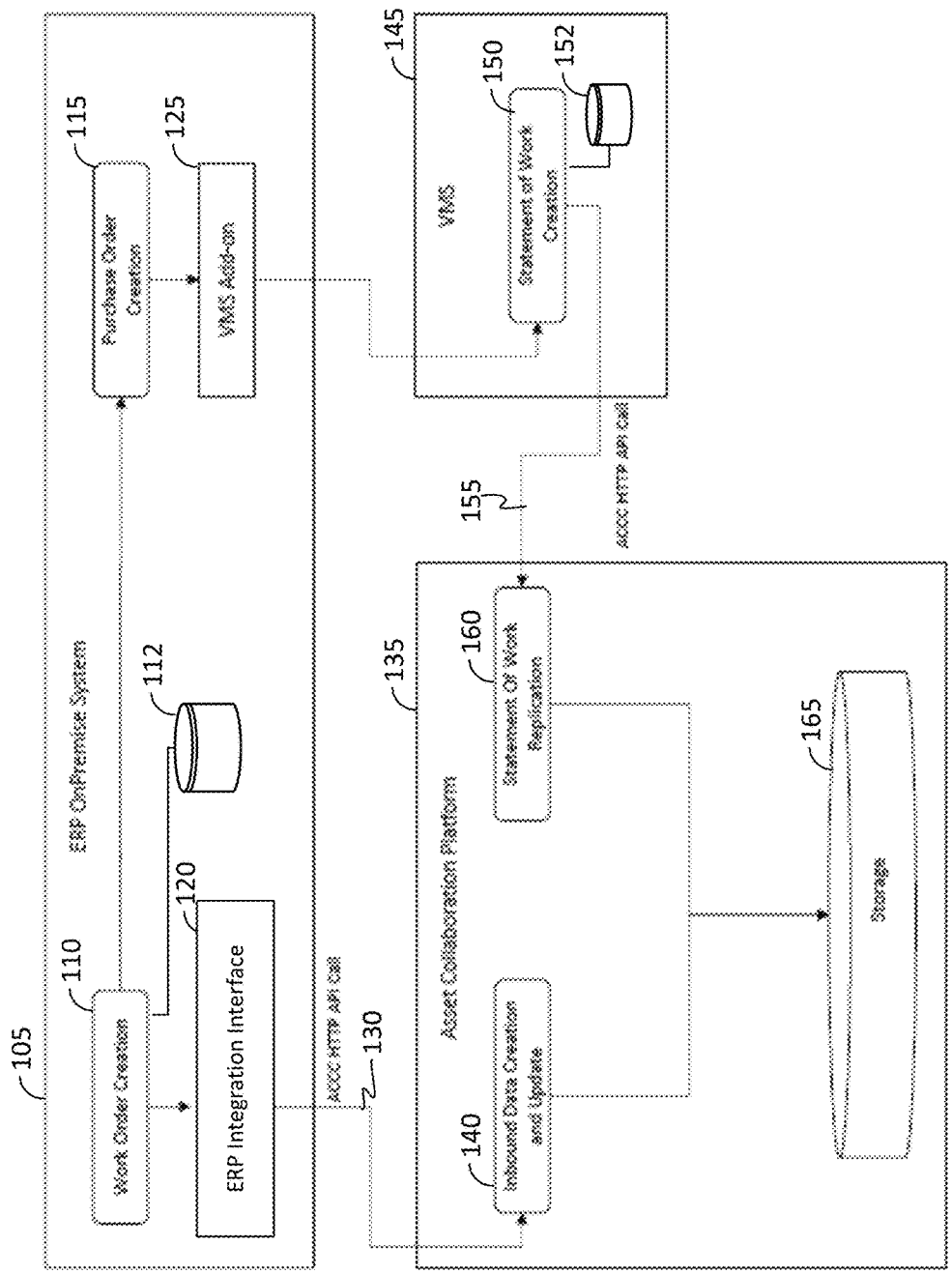
FIG. 1 is an illustrative depiction of a system architecture, according to an example embodiment.

The following description is provided to enable any person in the art to make and use the described embodiments. Various modifications, however, will remain readily apparent to those in the art.

In some aspects of the present disclosure, one embodiment includes a framework or architecture to integrate a plurality of different systems (e.g., networks) and services (e.g., cloud-based services) to provide unified visibility and access to data of the different systems and services. As used herein, integrated systems and services (sometimes referred to as an integrated network or collaboration platform herein) may provide, via connected infrastructure, shared storage and access to data related to two or more different systems and services. In some embodiments, a "common view" of the data managed by the integrated network may be provided to a plurality of entities associated with the different systems and services, wherein all of the various entities may have access and visibility to the data. In some aspects, all relevant information related to a subject matter (e.g., project, assignment, work order, etc.) might be digitized and comprise the entirety of the data managed by an integrated network herein.

Various aspects of one or more embodiments of the present disclosure may be illustrated by one or more example systems and processes. The one or more example systems and processes disclosed herein may be discussed with respect to one or more illustrative contexts. For instance, some aspects of the present disclosure will be discussed in the illustrative context of the maintenance of an industrial plant, wherein an operator of the industrial plant manages the maintenance of the different equipment (i.e., assets) of the plant. While the example systems and processes disclosed herein may be discussed with respect to a particular illustrative context, the present disclosure is not limited to any one or particular example context or implementation.

As an illustrative example context where the systems and processes of an integrated network disclosed herein may be useful, some aspects regarding the maintenance of the assets of an industrial plant by an operator of the plant will now be discussed. In some instances, in an effort to timely maintain the plant equipment, the plant operator may need to obtain the plant equipment and its associated documentation from one or more different equipment manufacturers and suppliers of the plant equipment, as well as engage with one or more outside vendors and service providers that can service or otherwise support the maintenance of the plant's assets. The outside vendors and service providers may typically need to access to all of the data (e.g., documentation) related to a particular asset that they are tasked to service, including, for example, the equipment specifications, manuals, and maintenance procedures from the manufacturers, the equipment's maintenance history, etc. In some instances, the operator might not have access to all of the information related to their equipment from the manufacturers and suppliers or it might not be digitized for readily sharing with the service providers. Additionally, the operator may typically have one or more back-end systems and networks supporting and implementing the processes (e.g., procurement, plant maintenance, etc.) related to the maintenance of their plant assets and the plurality of service providers may each also have back-end systems and networks that support the implementation of their work processes to provide their services to the operator.

However, a major impediment to having the entities (e.g., the operator, manufacturers, and service providers) efficiently collaborate and share the requisite related data to maintain the plant in a timely and reliable manner has previously been a lack of intelligent integration between the systems and services of the different entities. In some aspects, prior systems further required a network to grant extensive access rights to a third-party system in order for the third-party system to view, access, and share information with the network, oftentimes at great risk to the integrity and security of the data to be shared.

FIG. 1 is an illustrative depiction of an overall system architecture 100, according to an example embodiment. Continuing the example of plant maintenance, FIG. 1 is an illustrative system architecture 100 that might be utilized to integrate different systems and services (e.g., ERP system 105 and a vendor management system (VMS) 145) such that the plant operator associated with the ERP system and service providers associated with and managed via the VMS system may efficiently collaborate by accessing and sharing relevant data of their respective systems via an asset collaboration platform 135. Asset collaboration platform 135 provides a mechanism for the operator, service providers, and other entities to access data obtained from systems 105 and 145 (and other sources, even if indirectly). In some aspects, asset collaboration platform 135 provides a common view of the data stored and shared thereby. In some instances, entities accessing data shared by asset collaboration platform 135 may be presented, via a user interface, a view of all of the data integrated from the different systems 105 and 145 and shared by the asset collaboration platform.

Referring to FIG. 1, a work order may be created at 110 by the ERP system 105 in response to a maintenance request for an asset (equipment) in the plant. Relevant information regarding the asset may be sourced from a data repository 112 or other sources (not shown) and include, for example, manufacture equipment manuals, equipment specifications, equipment maintenance history, etc. Additionally, information used and included in the work order might also include details and constraints for the work to be performed under the work order, including for example, contractual obligations for service providers, scope of work to be performed, etc. The asset-related data, including metadata associated therewith, may be represented by one or more different data structures. Creation of the work order may trigger the creation of a purchase order at 115, where the purchase order might include information typical to a purchase order that outlines the purchase of services from one or more service providers to fulfill the work order. The created purchase order is released and a VMS interface 125 within ERP system 105 transmits the work order to VMS system 145. In response to receiving the purchase order, a statement of work is created at 150 in the VMS system.

In some aspects, creation of the work order at 110 and creation of the statement of work at 150 may provide the plant operator and a service provider associated with VMS system 145 with only limited view of the information related to the subject matter (i.e., the equipment or asset to be serviced). For example, the operator does not have full view to the statement of work 150 in the VMS system 145 and the service provider does not have access to all of the information related to the asset in the ERP system 105. As such, the ability for the operator and the service provider to fully and efficiently collaborate in the maintenance of the plant asset (s) may be hindered by, for example, the lack of visibility and access to all of the relevant information regarding the asset (e.g., who is the manufacturer of the equipment, what service bulletins are associated with the equipment, etc.) and the service provider (e.g., subcontractors that will be used by the service provider, the work capacity of the service contractor and their subcontractors, etc.).

The asset collaboration platform or network 135 in architecture 100 is configured to provide an intelligent integration with the VMS system 145. In some embodiments, the creation (or update) of the work order at 110 in the ERP system initiates the creation (or updating) of asset-related data in the asset collaboration platform at 140. The created or updated asset-related data may be transmitted to collaboration platform 135 via an ERP integration interface 120 (or the like) within ERP system 105. In some embodiments, the asset-related data may include all of the information associated with the asset being serviced and maintained (e.g., data and metadata associated with an asset).

In some embodiments, in response to the creation or updating of a work order at 110 in the ERP system, the newly created or updated information (represented as, for example, one or more data files, streams, or data structures) may be automatically transmitted to the asset collaboration platform or network 135 via an application programming interface (API) call as shown at 130. In some instances, the API may be provided by the asset collaboration platform. In some embodiments, information included in a newly created or updated statement of work in the VMS system 145 may be automatically transmitted to the asset collaboration platform or network 135 via an API call using an API provided by the asset collaboration platform, as shown at 155, in response to the creation or updating of the statement of work generated or updated at 150.

Data pushed to or otherwise received by the collaboration platform or network 135, including the created and updated of asset-related data received from ERP system 105 and the created and updated statement of work information received from VMS system 145, may be managed and stored in a data storage device, facility, or service 165 that provides shared access to such data with the entities (e.g., the operator, service providers, service provider contractors and subcontractors, manufacturers, etc.) that may provide information to the collaboration platform or network 135 or otherwise be provided access privileges to the data thereof.

In some embodiments, the data stored and shared by the collaboration platform or network 135, including the replicated statement of work 160 and worker information associated therewith might be accessed and intelligently shared with entities that might not have access to an instance of the VMS 145. Likewise, the data stored and shared by the collaboration platform or network 135, such as the asset-related data created and updated at 140 (e.g., updated manufacturer bulletins and service reports, etc.), might be accessed and intelligently shared with entities (e.g., service providers and subcontractors thereof) that might not have access to an instance of the ERP 105.

Accordingly, in some aspects, a collaboration platform or network disclosed herein might provide a mechanism to access shared information in a controlled and secure manner without necessarily granting an entity access to a particular system, network, application, or service that sources the information.

Figure 2:
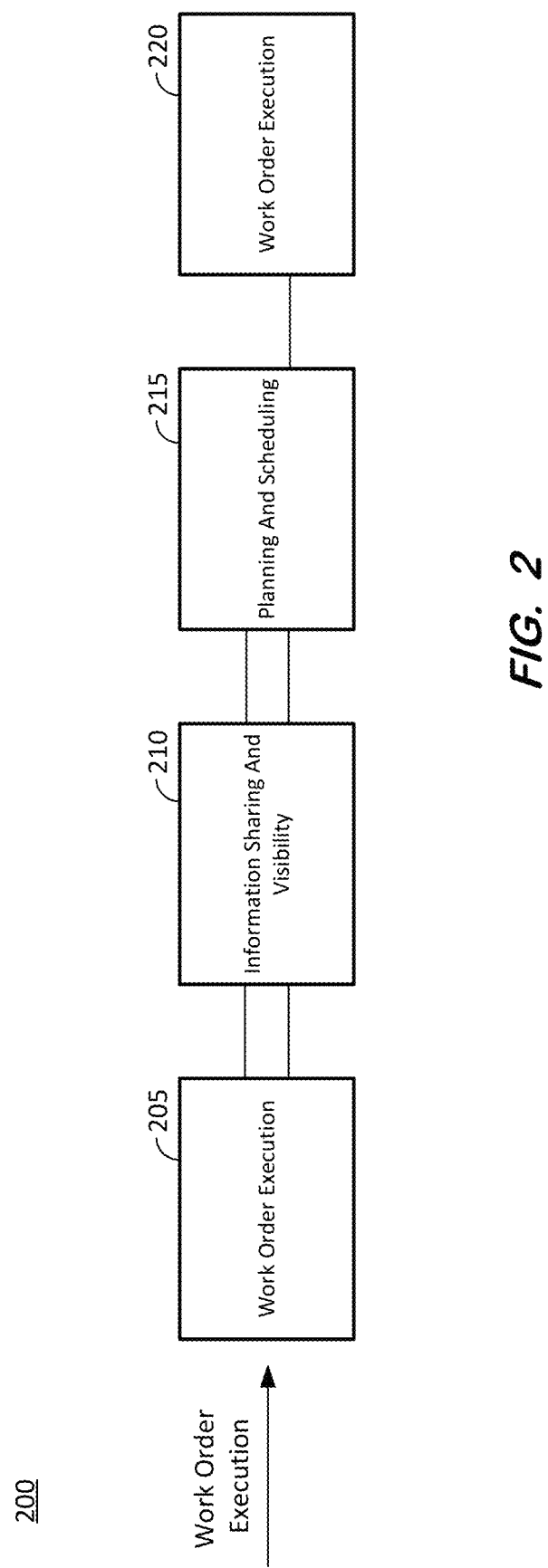
FIG. 2 is an illustrative process flow, according to an example embodiment.

FIG. 2 is an illustrative process flow 200 related to an example embodiment. In particular, process 200 relates to an execution of a work order that might be processed by a collaboration platform or network herein. At node 205, a work order may be created on behalf of a plant operator in response to a request to have a particular asset serviced. In one instance, the work request might be generated automatically based on an unplanned alarm or based on a scheduled routine maintenance task. The creation (or updating) of the work order at 205 may trigger or otherwise cause the creation of a purchase order (e.g., FIG. 1, 115) and creation (or updating) of a statement of work (FIG. 1, 150), which further causes the creation (or updating) of a replicated statement of work and the creation (or updating) of asset-related data (FIG. 1, 140) in a collaboration platform or network herein (e.g., FIG. 1, 135).

At node 205, the replicated statement of work and the asset-related data is stored, managed, and maintained by the collaboration platform, where it may be accessed (e.g., via API calls) by, for example, operators, suppliers, service provider contractors and subcontractors, and other entities. In some embodiments, the asset-related data from an ERP system, service, or network is provided, as well as data from an integrated VMS system or service. As such, in some embodiments, data related to, for example, supplier accounts, plant maintenance, equipment location, workforce availability, etc. may be shared and visible at node 210 to facilitate and support the execution of a work order in a collaborative manner.

Continuing to node 215, the replicated statement of work shared by the collaboration platform herein may be accessed and used by, for example, service provider(s) so that they may perform planning and scheduling with contractors, workers, and subcontractors, as well as other tasks outlined by the statement of work. At node 220, subcontractors, specialized technicians, and the like may perform the maintenance tasks specified in the statement of work at the equipment location, in accordance with the improved visibility provided by the collaboration platform herein. In some embodiments, process 200 may further include a confirmation of the execution of the work order.

In some aspects, the flow of data between the various nodes depicted in FIG. 2 is made possible due to the integration of different systems and services provided by a collaboration platform herein, as illustrated in the example of FIG. 1.

In some aspects, a collaboration platform or network disclosed herein may integrate different systems, services, and networks together, as discussed above. In some aspects, a mechanism or process may be provided such that entities can be correlated or otherwise mapped to different systems or services. For example, an entity (e.g., an operator or a buyer) associated with a first service (e.g., the collaboration platform or network) may be correlated with a second service (e.g., an VMS service) that is integrated with the first service. Additionally, a second entity (e.g., a service provider) associated with the first service (e.g., the collaboration platform or network herein) may also be correlated to the second service (e.g., the VMS service) that is integrated with the first service. In this manner the different entities, such as operators and service providers (or a system/network representative presence thereof), may each be correlated to, mapped to, or otherwise associated across multiple (e.g., two or more) integrated systems and services.

Figure 3:
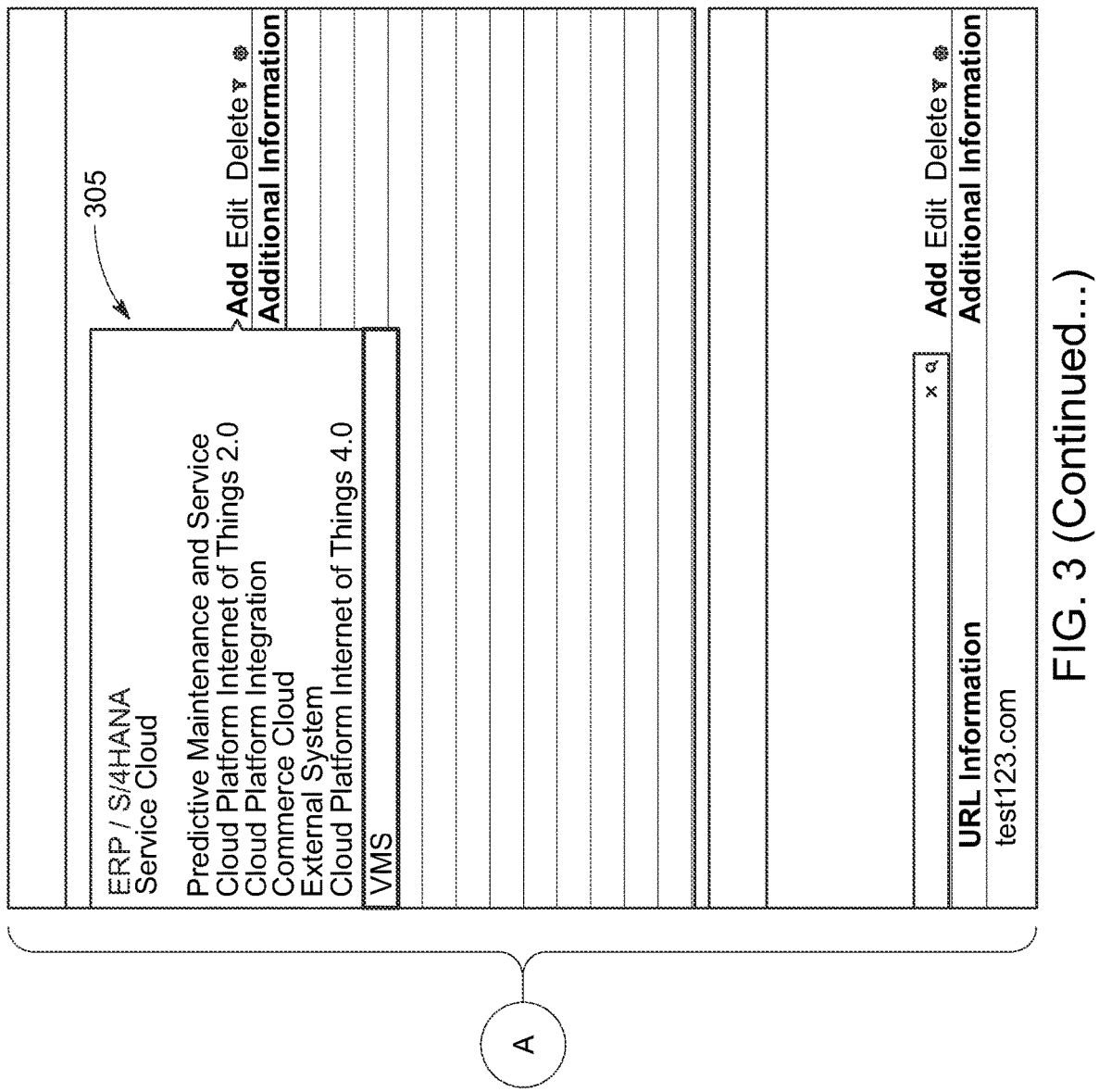
FIG. 3 is an illustrative outward facing user interface for configuring an integrated service, according to an example embodiment.

FIGS. 3-8 provide illustrative depictions of an example embodiment to correlate, map, or otherwise associate entities across multiple (e.g., two or more) systems and services for use in a collaboration platform or network herein. Referring to FIG. 3, a first user (e.g., a buyer) in the collaboration platform or network (i.e., a first service) may specify a second, external service to which they would like to have an integration. As shown in FIG. 3, a user interface (UI) 300 is depicted wherein the first user can specify a particular system for integration with the collaboration platform or network via a context menu 305. UI 300 may further present another context menu wherein the first user can specify details regarding the second system for the integration, as shown at 310. The specification details regarding the second system might include, for example, a system type, a system name, API call configurations, API call credential requirements, etc. and other details to ensure the collaboration platform or network can integrate with the second service.

Figure 4:
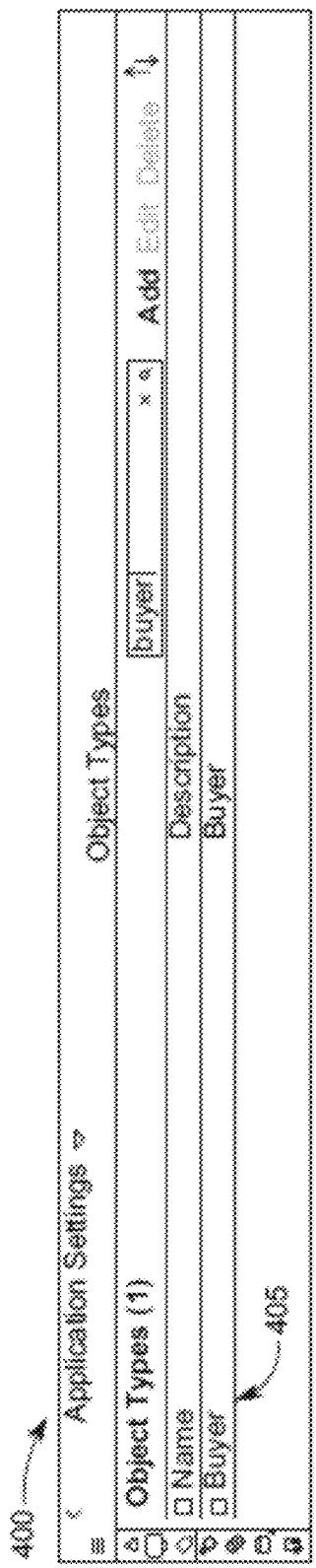
FIG. 4 is an illustrative outward facing user interface for defining an object type for an integrated service, according to an example embodiment.

FIG. 4 is an illustrative outward facing user interface 400 for defining an object type for an integrated service, according to an example embodiment. In some embodiments, the first user might (optionally) specify an object type for their presence in the collaboration platform or network. In the example of FIG. 4, the first user specifies they are a "buyer", as shown at 405.

Figure 5:
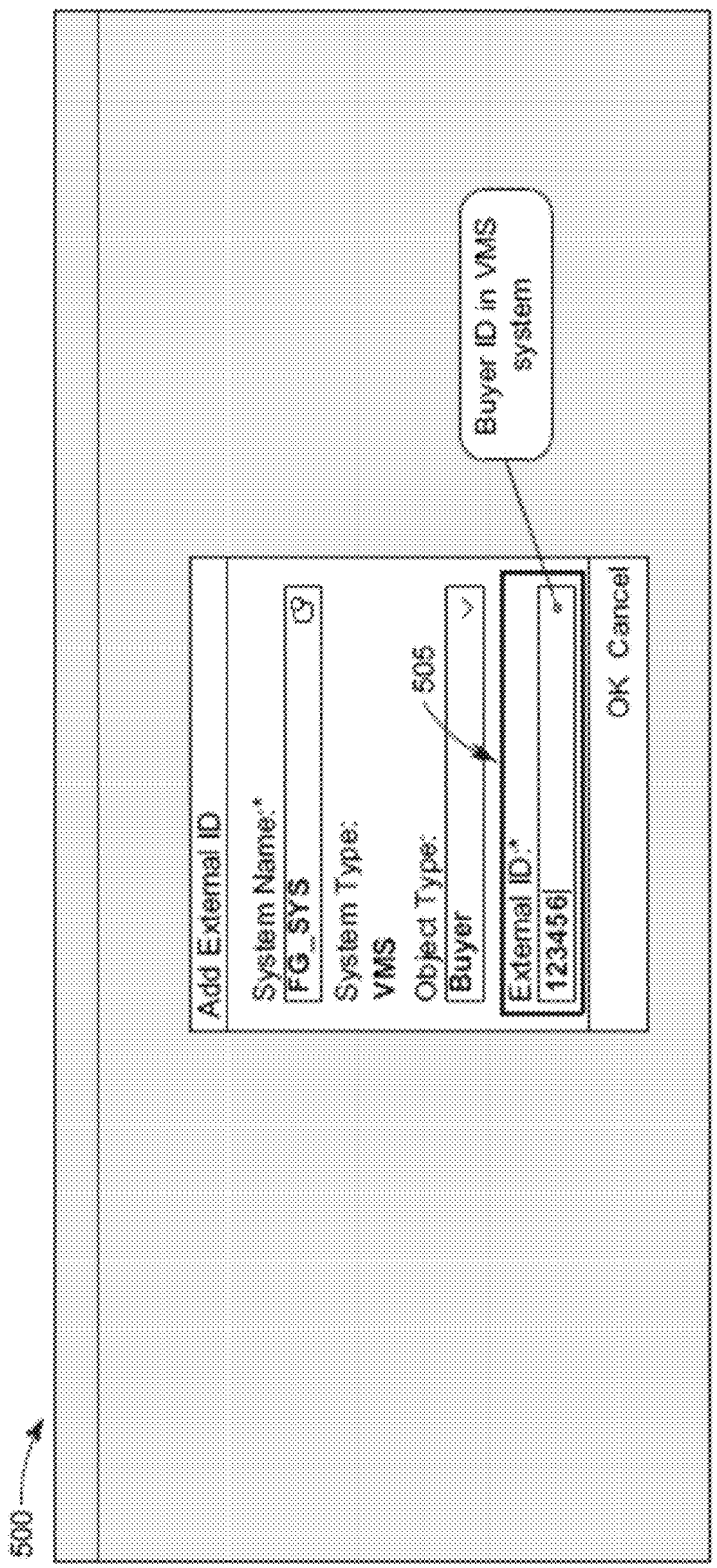
FIG. 5 is an illustrative outward facing user interface for mapping a user identity for an integrated service, according to an example embodiment.

FIG. 5 is an illustrative outward facing user interface 500 for mapping a user identity for the integrated service, according to an example embodiment. In the example of FIG. 5, the first user, in the collaboration platform, specifies their identity in the second service that is being integrated. That is, the user specifies their user identity in the second service (e.g., Buyer ID: "123456"), as shown at 505. The first user may select "OK" in UI 500 to save the specified mapping. The first user's (i.e., the buyer's) identity in the second service is stored and maintained in the collaboration platform so that data associated with the first user and subsequently received from the integrated, second service may be accurately correlated with the user in the collaboration platform. For example, data included in a replicated work order received from the second service (e.g., a VMS service) with the user ID of "123456" may be accurately recognized and processed as data pertaining to the buyer (i.e., first user) in the collaboration platform.

Figure 6:
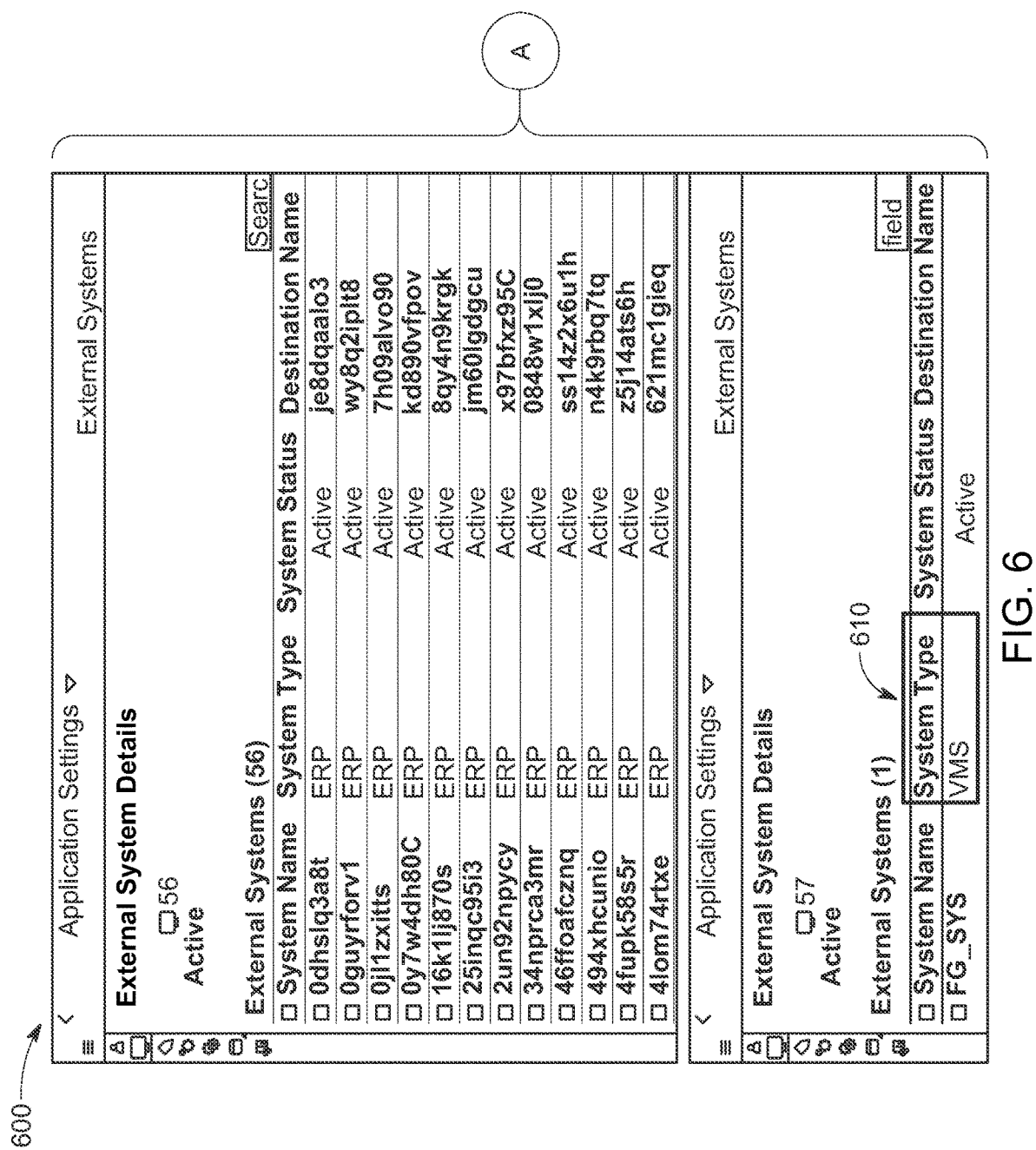
FIG. 6 is an illustrative outward facing user interface for configuring an integrated service, according to some example embodiments.
Figures 7, 8:
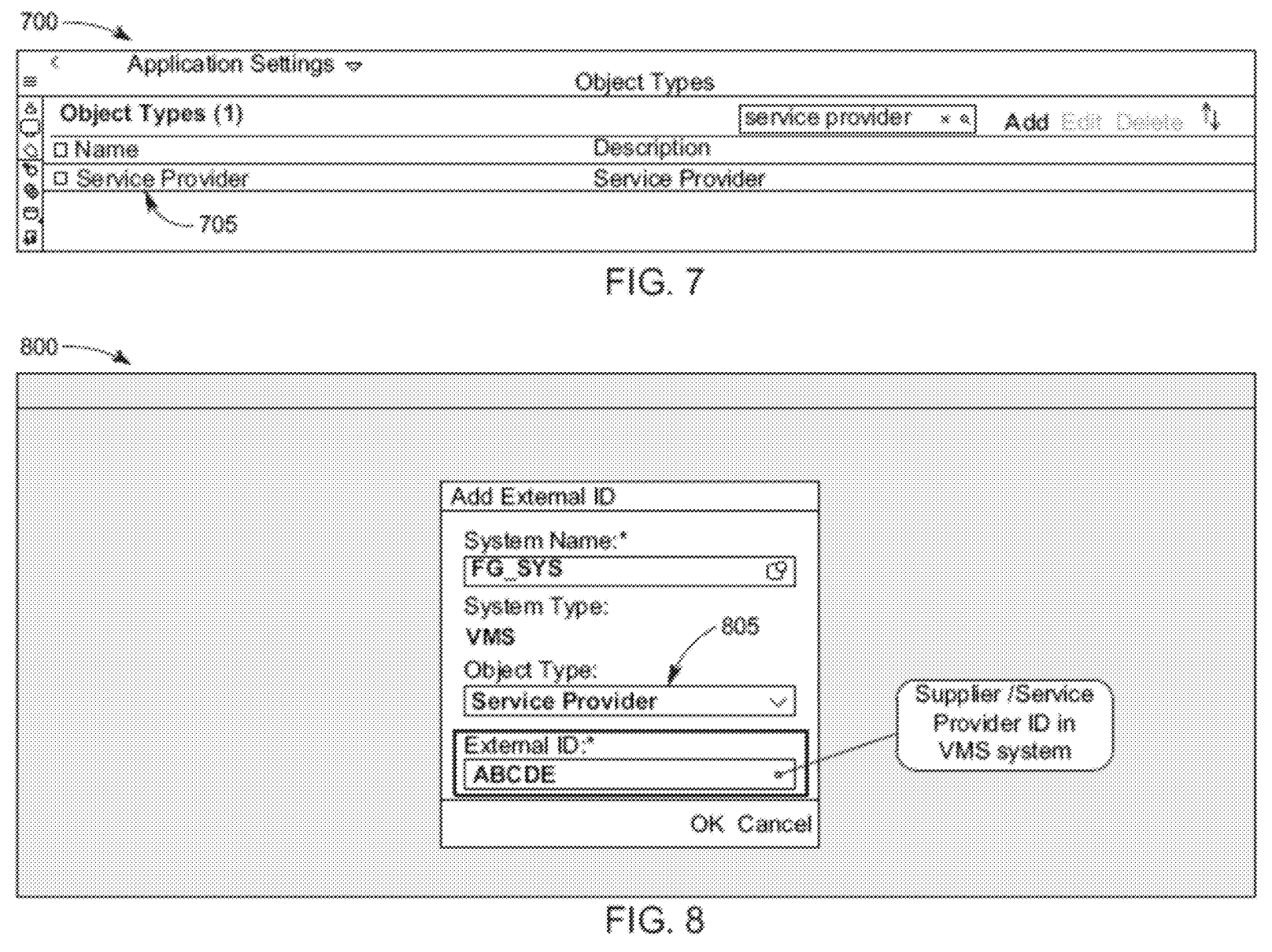

FIGS. 6-8 provide illustrative depictions of UI's to correlate, map, or otherwise associate a second user (e.g., a supplier) of the collaboration platform to the second service for use in the collaboration platform or network herein. As such, in a similar manner to FIG. 3, in FIG. 6 a UI 600 is presented wherein the second user can specify the second service for integration with the collaboration platform via a context menu 605. Here, the second user is a service provider. UI 600 further presents a context menu wherein the second user can specify details regarding the second system for the integration, as shown at 610.

FIG. 7 is an illustrative outward facing user interface 700 for (optionally) defining an object type for an integrated service, according to an example embodiment. In some embodiments, the second user might specify an object type for their presence in the collaboration platform or network. In the example of FIG. 7, the second user specifies they are a "service provider", as shown at 705.

FIG. 8 is an illustrative outward facing user interface 800 for mapping a user identity for the integrated service, according to an example embodiment. In FIG. 8, the second user, via the collaboration platform, specifies their identity in the second service that is being integrated. As shown, the second user specifies their user identity in the second service (e.g., Service Provider ID: "ABCDE"), as shown at 805. The second user can further select "OK" in the UI to save the specified mapping. The second user's (i.e., the service provider's) identity in the second service is thus stored and maintained in the collaboration platform so that data associated with the second user and later received from the integrated, second service may be accurately correlated with the second user in the collaboration platform.

In some embodiments, the entity correlation process(es) depicted in the examples of FIGS. 3-8 might include a minimum set of operations that may be used in an entity correlation process herein. As such, an entity correlation process herein may include alternative, other, additional, and substitute operations relative to the specific disclosed operations.

Continuing the example of a work order creation and execution by a collaboration platform as introduced above, support may be desired for the replication of a statement of work from a VMS service (e.g., FIG. 1, 145) to the asset collaboration platform 135 for work orders. In some aspects, a user might define the replication criteria (based on work orders, statements of work, etc.) in the VMS system and may retrieve the file with a statement of work data, worker's data, etc. from a data storage device (e.g., FIG. 1, data device 152). The VMS system may push the replicated statement of work file(s) to the collaboration platform using an API provided by the collaboration platform. The collaboration platform may receive the replicated statement of work file(s) and persist such file(s) in a data storage device, service, or system that is accessible appropriately authorized users and entities.

FIG. 9 is an illustrative depiction of a representation of example data related to an integrated system and service, according to an example embodiment. As shown in table 900 may represent data that is stored and maintained by a collaboration platform herein. Columns 905 and 910 refer to an object type and data fields, respectively. As shown, table 900 lists a number of field parameters for a "SoW (Statement of Work)" 915 object type and a plurality of field parameters for a "Worker" 920 object type. Specific instances of data modeled on table 900 might be persisted by a collaboration platform for an initial loading of a statement of work from a VMS system or service. In a scenario where a statement of work changes, such that the data associated with the statement of work changes, then the data changes may be replicated and automatically pushed to the collaboration platform in an updated replicated statement of work.

FIG. 10 is an illustrative flow diagram for a process 1000 related to an integrated system and service, according to an example embodiment. In some aspects, process 1000 includes features to integrate a second service to a first service. In one embodiment, the first service might be a collaboration platform, service, network and the second service might be an instance of a VMS system (e.g., FIG. 1, 145). It is noted that the use of the terms a "first" service and a "second" service herein is only meant to distinguish the two services from each, as opposed to any other significance, meaning, or priority. Likewise, the use of the terms a "first" user and a "second" user is only meant to distinguish the two users from each and signals no other significance or meaning. The reference to the example of FIG. 1 that includes a VMS system or service is meant to provide an illustrative example of a possible embodiment for the second service. As such, the second service referenced in the present discussion of FIG. 10 is not limited or otherwise restricted to being a VMS system.

At operation 1005, a first user of a first service (e.g., a collaboration platform) may receive an indication of a second service (e.g., a VMS system) to integrate with the first service. In some aspects, the second service is distinct from and external to the first service. The indication of the second service might include one or more configuration details, where the configuration details may include technical specifications, settings, rules, and the like to enable or facilitate configuring the first service to effectively interface with the second service to support a collaborative execution of processes between the first and second services.

At operation 1010, a presence of the first user of the first service may be correlated with an identifier of the first user in the second service. This operation 1010 may include some of the features of the entity mapping disclosed hereinabove regarding FIG. 6. The correlating or mapping performed at operation 1010 may support the recognition and processing of data associated with the first user (e.g., a buyer or operator in the context of the example work order execution process hereinabove) in the second system by the collaboration platform.

Operation 1015 may be similar to operation 1005, except a second user of the first service may receive an indication of the second service that will be integrated with the first service. Hereto, the indication of the second service might include one or more configuration details to support, provide, or facilitate effectively configuring the first service to interface with the second service.

Continuing to operation 1020, operation 1020 may be similar to operation 1010 in some aspects. At operation 1020, a presence of the second user of the first service may be correlated with an identifier of the second user in the second service. In some aspects, operation 1020 may include some of the features of the entity mapping disclosed hereinabove regarding FIG. 8. The correlating or mapping performed at operation 1020 may support the recognition and processing of data associated with the second user (e.g., a supplier or service provider in the context of the example work order execution process hereinabove) in the second system by the collaboration platform.

Referring to operation 1025, a replication of a work specification generated by the second service and associated with the second user may be received from the second service. In some embodiments, the work specification might be transmitted from the second service using an API call. In some embodiments, the API may be provided by and include configuration details specified by the first service. As used herein, the "work specification" might refer to a replicated statement of work in the context of the example work order execution process discussed hereinabove. However, the "work specification" might refer to the exchange of any data request, message, instruction, command, or the like to perform one or more operations or functions, including but not limited to the sharing, processing, accessing, modifying, creating, monitoring, and deleting of data and data structure representations thereof.

At operation 1030, the replication of the work specification received from the second system in operation 1025 may be stored in a data store of the first service. In some embodiments, the replication of the work specification may be persisted in a data repository, an instance of a database management system, a data lake, or other data storage system, device, or service. In some aspects, the replication of the work specification maintained in the data storage of the first service (e.g., the collaboration platform) may be accessible by one or more of the first user and the second user of the first service. In this manner, process 1000 provides a mechanism wherein the users may be recognized across the different, integrated services and have access to related data stored in an accessible data store of the collaboration platform.

Figure 11:
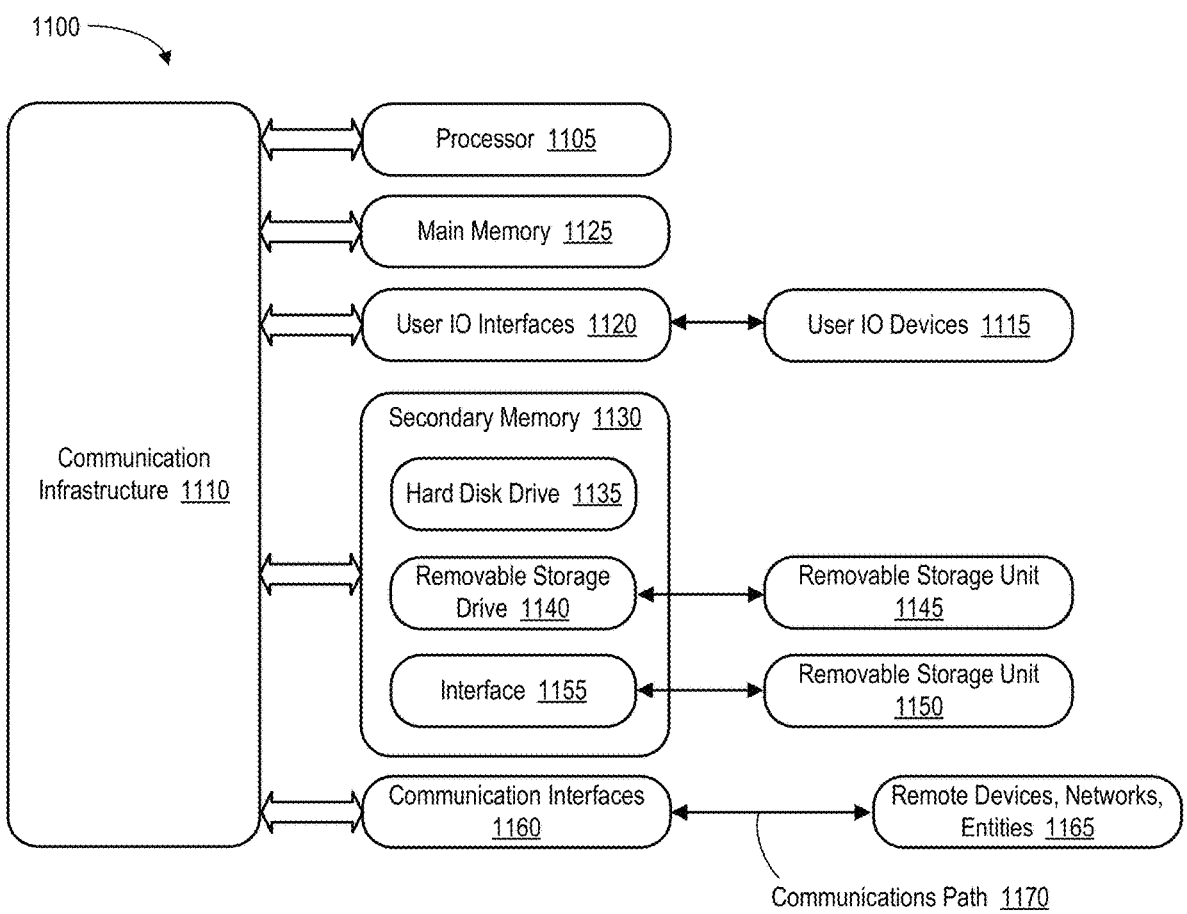
FIG. 11 is a block diagram of an apparatus useful for implementing various aspects disclosed herein, according to some example embodiments.

Various embodiments of a collaboration system and service disclosed herein may be implemented, for example, using one or more computer systems, such as computer system 1100 shown in FIG. 11. The computer system 1100 can be any computer capable of performing the functions described herein. Computer system 1100 includes one or more processors (also called CPUs), such as a processor 1105. Processor 1105 is connected to a communication infrastructure or bus 1110.

One or more processors 1105 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1115, such as monitors, keyboards, pointing devices, etc., that communicate with communication infrastructure xx06 through user input/output interface(s) 1120.

Computer system 1100 also includes a main or primary memory 1125, such as Random-Access Memory ("RAM"). Main memory 1125 may include one or more levels of cache. Main memory 1125 has stored therein control logic (i.e., computer software) and/or data.

Computer system 1100 may also include one or more secondary storage devices or memory 1130. Secondary memory 1130 may include, for example, a hard disk drive 1135 and/or a removable storage device or drive 1140. Removable storage drive 1140 may be a floppy disk drive, a magnetic tape drive, a compact disk drive, an optical storage device, tape backup device, and/or any other storage device/drive.

Removable storage drive 1140 may interact with a removable storage unit 1145. Removable storage unit 1145 includes a computer usable or readable storage device having stored thereon computer software (control logic) and/or data. Removable storage unit 1145 may be a floppy disk, magnetic tape, compact disk, DVD, optical storage disk, and/any other computer data storage device. Removable storage drive 1140 reads from and/or writes to removable storage unit 1145 in a well-known manner.

According to an exemplary embodiment, secondary memory 1130 may include other means, instrumentalities or other approaches for allowing computer programs and/or other instructions and/or data to be accessed by computer system 1100. Such means, instrumentalities or other approaches may include, for example, a removable storage unit 1150 and an interface 1155. Examples of the removable storage unit 1150 and the interface 1155 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1160. Communication interface 1160 enables computer system 1100 to communicate and interact with any combination of remote devices, remote networks, remote entities, etc. (individually and collectively referenced by reference number 1165). For example, communication interface 1160 may allow computer system 1100 to communicate with remote devices 1165 over communications path 1170, which may be wired and/or wireless, and which may include any combination of LANs, WANs, the Internet, etc. Control logic and/or data may be transmitted to and from computer system 1100 via communication path 1170.

In an embodiment, anon-transitory tangible apparatus or article of manufacture comprising a tangible computer useable or readable medium having control logic (software) stored thereon is also referred to herein as a computer program product or program storage device. This includes, but is not limited to, computer system 1100, main memory 1125, secondary memory 1130, and removable storage units 1145 and 1150, as well as tangible articles of manufacture embodying any combination of the foregoing. Such control logic, when executed by one or more data processing devices (such as computer system 1100), causes such data processing devices to operate as described herein.

Based on the present disclosure, it will be apparent to persons skilled in the relevant art(s) how to make and use embodiments of the invention using data processing devices, computer systems and/or computer architectures other than that shown in FIG. 11. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. Embodiments are therefore not limited to any specific combination of hardware and software.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments disclosed herein are solely for the purpose of illustration. Those in the art will recognize other embodiments may be practiced with modifications and alterations to that described above.

What is claimed is:

1. A computer-implemented method, the method comprising:
   receiving, from a first user of a first service, an indication of a second service to integrate with the first service;
   correlating, in the first service, a presence of the first user of the first service with an identifier of the first user in the second service;
   receiving, from a second user of the first service, an indication of the second service to integrate with the first service;
   correlating, in the first service, a presence of the second user of the first service with an identifier of the second user in the second service;
   receiving, from the second service via an application programming interface (API), a replication of a work specification generated by the second service and associated with the second user; and storing the replication of the work specification received from the second service in a data store of the first service that is accessible by the first user of the first service.

2. The method of claim 1, further comprising receiving an indication of a value for an object type for one or more of the first user and the second user, wherein at least one of the identifier of the first user in the second service and the identifier of the second user in the second service is defined by an object type.

3. The method of claim 1, further comprising, for each of a plurality of additional users of the first service:
receiving, from each of the additional users of the first service, an indication of the second service to integrate with the first service; and
correlating, in the first service, a presence of each of the additional users of the first service with an identifier of each of the additional users in the second service.

4. The method of claim 1, wherein the replication of the work specification generated by the second service is automatically received from the second service via the API in response to an initial generation of the work specification.

5. The method of claim 1, further comprising:
automatically receiving, from the second service via the API in response to a change to the work specification generated by the second service, an updated replication including at least the change to the work specification; and
storing the updated replication of the work specification received from the second service in the data store of the first service.

6. The method of claim 1, further comprising:
receiving, from a third service via a second API, a replication of a work order generated by the third service and associated with the first user; and
storing the replication of the work order received from the third service in the data store of the first service.

7. The method of claim 1, wherein the API, including a specification for an implementation of the API is provided to the second service by the first service.

8. A system comprising:
at least one programmable processor; and
a non-transitory machine-readable medium storing instructions that, when executed by the at least one programmable processor, cause the at least one programmable processor to perform operations comprising:
receiving, from a first user of a first service, an indication of a second service to integrate with the first service;
correlating, in the first service, a presence of the first user of the first service with an identifier of the first user in the second service;
receiving, from a second user of the first service, an indication of the second service to integrate with the first service;
correlating, in the first service, a presence of the second user of the first service with an identifier of the second user in the second service;
receiving, from the second service via an application programming interface (API), a replication of a work specification generated by the second service and associated with the second user; and
storing the replication of the work specification received from the second service in a data store of the first service that is accessible by the first user of the first service.

9. The system of claim 8, wherein the non-transitory machine-readable medium storing instructions that, when executed by the at least one programmable processor, cause the at least one programmable processor to further perform operations comprising:
receiving an indication of a value for an object type for one or more of the first user and the second user, wherein at least one of the identifier of the first user in the second service and the identifier of the second user in the second service is defined by an object type.

10. The system of claim 8, wherein the non-transitory machine-readable medium storing instructions that, when executed by the at least one programmable processor, cause the at least one programmable processor to further perform operations comprising:
for each of a plurality of additional users of the first service:
receiving, from each of the additional users of the first service, an indication of the second service to integrate with the first service; and
correlating, in the first service, a presence of each of the additional users of the first service with an identifier of each of the additional users in the second service.

11. The system of claim 8, wherein the replication of the work specification generated by the second service is automatically received from the second service via the API in response to an initial generation of the work specification.

12. The system of claim 8, wherein the non-transitory machine-readable medium storing instructions that, when executed by the at least one programmable processor, cause the at least one programmable processor to further perform operations comprising:
automatically receiving, from the second service via the API in response to a change to the work specification generated by the second service, an updated replication including at least the change to the work specification; and
storing the updated replication of the work specification received from the second system in the data store of the first service.

13. The system of claim 8, wherein the non-transitory machine-readable medium storing instructions that, when executed by the at least one programmable processor, cause the at least one programmable processor to further perform operations comprising:
receiving, from a third service via a second API, a replication of a work order generated by the third service and associated with the first user; and
storing the replication of the work order received from the third service in the data store of the first service.

14. A non-transitory, computer readable medium storing instructions, which when executed by at least one processor cause a computer to perform a method comprising:
receiving, from a first user of a first service, an indication of a second service to integrate with the first service;
correlating, in the first service, a presence of the first user of the first service with an identifier of the first user in the second service;
receiving, from a second user of the first service, an indication of the second service to integrate with the first service;
correlating, in the first service, a presence of the second user of the first service with an identifier of the second user in the second service;
receiving, from the second service via an application programming interface (API), a replication of a work specification generated by the second service and associated with the second user; and storing the replication of the work specification received from the second service in a data store of the first service that is accessible by the first user of the first service.

15. The medium of claim 14, storing instructions, which when executed by at least one processor cause a computer to perform a method further comprising:

receiving an indication of a value for an object type for one or more of the first user and the second user, wherein at least one of the identifier of the first user in the second service and the identifier of the second user in the second service is defined by an object type.

16. The medium of claim 14, storing instructions, which when executed by at least one processor cause a computer to perform a method further comprising:

for each of a plurality of additional users of the first service:

receiving, from each of the additional users of the first service, an indication of the second service to integrate with the first service; and correlating, in the first service, a presence of each of the additional users of the first service with an identifier of each of the additional users in the second service.

17. The medium of claim 14, wherein the replication of the work specification generated by the second service is automatically received from the second service via the API in response to an initial generation of the work specification.

18. The medium of claim 14, storing instructions, which when executed by at least one processor cause a computer to perform a method further comprising:

automatically receiving, from the second service via the API in response to a change to the work specification generated by the second service, an updated replication including at least the change to the work specification; and storing the updated replication of the work specification received from the second service in the data store of the first service.

19. The medium of claim 14, storing instructions, which when executed by at least one processor cause a computer to perform a method further comprising:

receiving, from a third service via a second API, a replication of a work order generated by the third service and associated with the first user; and storing the replication of the work order received from the third service in the data store of the first service.

20. The medium of claim 14, wherein the API, including a specification for an implementation of the API is provided to the second service by the first service.

* * * * *